(12) United States Patent
Wickline

(10) Patent No.: US 10,767,915 B2
(45) Date of Patent: Sep. 8, 2020

(54) SMARTER COOLER

(71) Applicant: Stephen Wickline, Chino Valley, AZ (US)

(72) Inventor: Stephen Wickline, Chino Valley, AZ (US)

( * ) Notice: Subject to any disclaimer, the term of this patent is extended or adjusted under 35 U.S.C. 154(b) by 100 days.

(21) Appl. No.: 13/904,281

(22) Filed: May 29, 2013

(65) Prior Publication Data

US 2014/0352350 A1    Dec. 4, 2014

(51) Int. Cl.
| | |
|---|---|
| *F25D 3/08* | (2006.01) |
| *F25D 3/14* | (2006.01) |
| *F25D 3/02* | (2006.01) |
| *F25D 3/12* | (2006.01) |
| *F25D 3/06* | (2006.01) |

(52) U.S. Cl.
CPC ............... *F25D 3/08* (2013.01); *F25D 3/02* (2013.01); *F25D 3/06* (2013.01); *F25D 3/125* (2013.01); *F25D 3/14* (2013.01); *F25D 2303/081* (2013.01); *F25D 2303/0831* (2013.01); *F25D 2303/0843* (2013.01); *F25D 2331/804* (2013.01); *Y02A 40/968* (2018.01)

(58) Field of Classification Search
CPC .... F25B 3/08; F25B 2303/08; F25B 2303/00; F25B 2303/081; F25B 2303/083; F25D 3/02; F25D 3/06; F25D 3/08; F25D 3/125; F25D 3/14; F25D 9/00; F25D 2303/0821; F25D 23/069; F25D 2303/08; B65D 25/04
USPC ...................................... 62/457.2, 457.3, 530
See application file for complete search history.

(56) References Cited

U.S. PATENT DOCUMENTS

| | | | | |
|---|---|---|---|---|
| 4,287,265 | A * | 9/1981 | McKnight | B65D 81/056 206/586 |
| 4,836,379 | A * | 6/1989 | Shaw | B65D 81/107 206/453 |
| 5,605,056 | A * | 2/1997 | Brown et al. | 62/457.4 |
| 5,671,611 | A * | 9/1997 | Quigley | F25D 3/08 62/457.7 |
| 6,193,097 | B1 * | 2/2001 | Martin Perianes | 220/592.03 |
| 6,536,228 | B1 * | 3/2003 | Hall | F25D 3/08 62/457.2 |
| 6,626,006 | B1 * | 9/2003 | Tedder | F25D 3/08 220/915.2 |
| 6,782,711 | B2 * | 8/2004 | Abfalter | 62/457.7 |
| 7,886,936 | B2 * | 2/2011 | Helline | 222/185.1 |
| 7,950,249 | B1 * | 5/2011 | White | F25D 3/08 62/457.1 |

(Continued)

*Primary Examiner* — Frantz F Jules
*Assistant Examiner* — Lionel Nouketcha
(74) *Attorney, Agent, or Firm* — Lamon Patent Services; Cynthia S Lamon

(57) ABSTRACT

The Smarter Cooler with its Insert Isolator design will provide cooling from four different large areas surrounding the food on all sides, as well as providing a cooler and better insulated bottom area of the cooler, and once the "Ice" starts to melt and be stored in the Ice Water Reservoir below the food and beverage storage area, an additional surface, five areas, not only has insulation qualities, but also cooling properties, to help keep food and beverages colder longer. The result will be a cooler that keeps the ice water isolated from the food and beverages in the cooler to prevent spoilage of the food, that inevitably drops into the melted ice water in any other cooler on the market.

6 Claims, 3 Drawing Sheets

(56) References Cited

U.S. PATENT DOCUMENTS

| | | | |
|---|---|---|---|
| 8,065,889 B1* | 11/2011 | Silberman | F25D 3/08 62/457.7 |
| 2004/0069009 A1* | 4/2004 | Tedder | 62/457.7 |
| 2004/0093892 A1* | 5/2004 | Abfalter | 62/457.7 |
| 2004/0262319 A1* | 12/2004 | Fisher | 220/592.03 |
| 2006/0289445 A1* | 12/2006 | Colonna | F25D 3/08 219/439 |
| 2007/0125118 A1* | 6/2007 | Hooper | 62/389 |
| 2008/0047296 A1* | 2/2008 | Helmer | F25D 3/08 62/457.7 |
| 2008/0087037 A1* | 4/2008 | Rapaz | F25D 3/08 62/457.2 |
| 2008/0135564 A1* | 6/2008 | Romero | B65D 81/3827 220/592.2 |
| 2008/0178629 A1* | 7/2008 | Meether | F25D 3/08 62/451 |
| 2009/0320517 A1* | 12/2009 | Lavallee | 62/457.2 |
| 2010/0005827 A1* | 1/2010 | Winkler | 62/457.2 |
| 2010/0212351 A1* | 8/2010 | Chapin et al. | 62/457.5 |
| 2011/0030413 A1* | 2/2011 | Heil | 62/407 |
| 2011/0259898 A1* | 10/2011 | Mogil et al. | 220/592.03 |
| 2013/0126537 A1* | 5/2013 | Patterson | A45F 3/46 220/592.01 |

\* cited by examiner

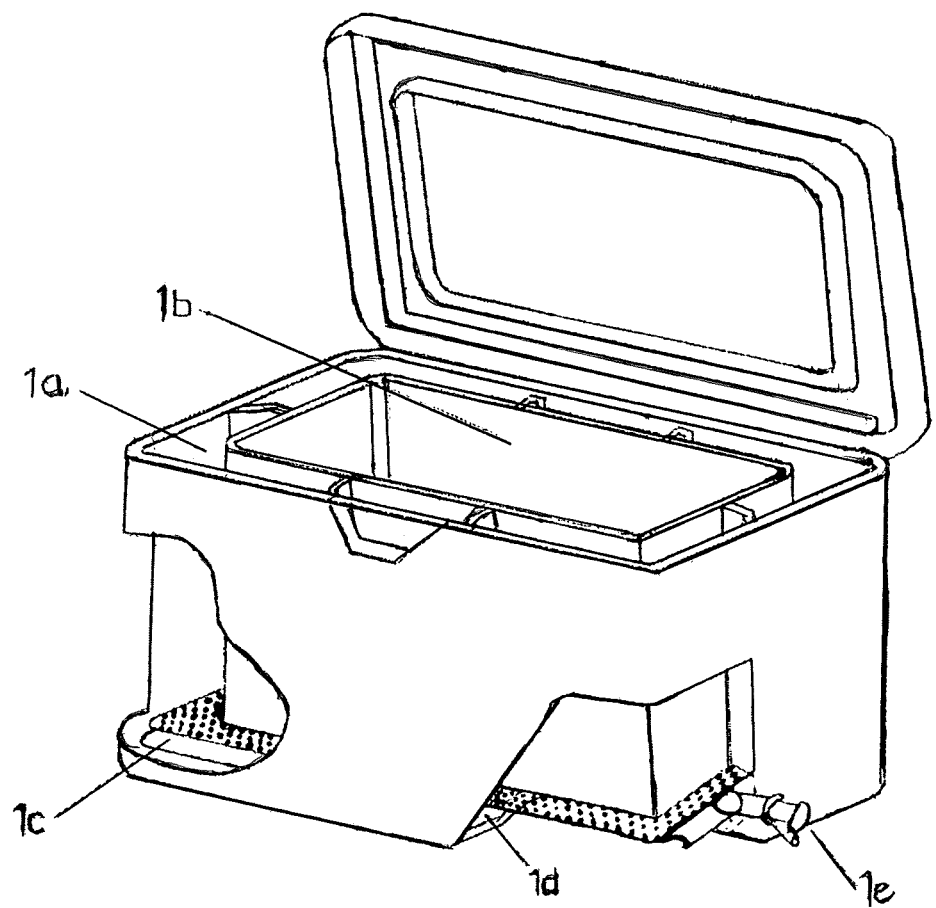

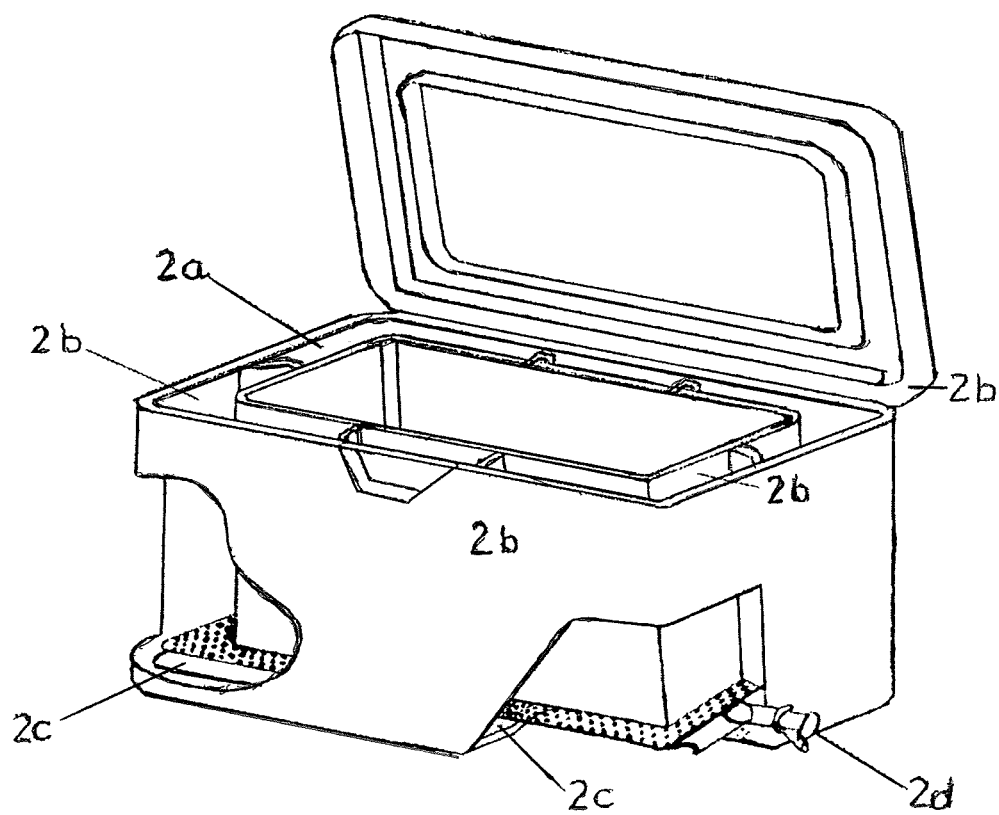

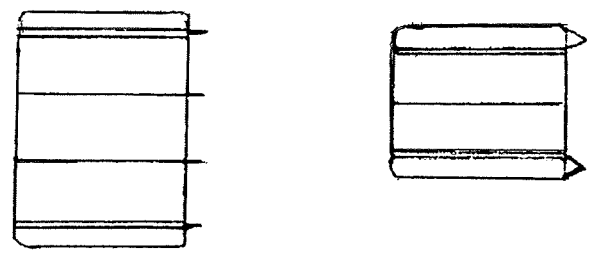
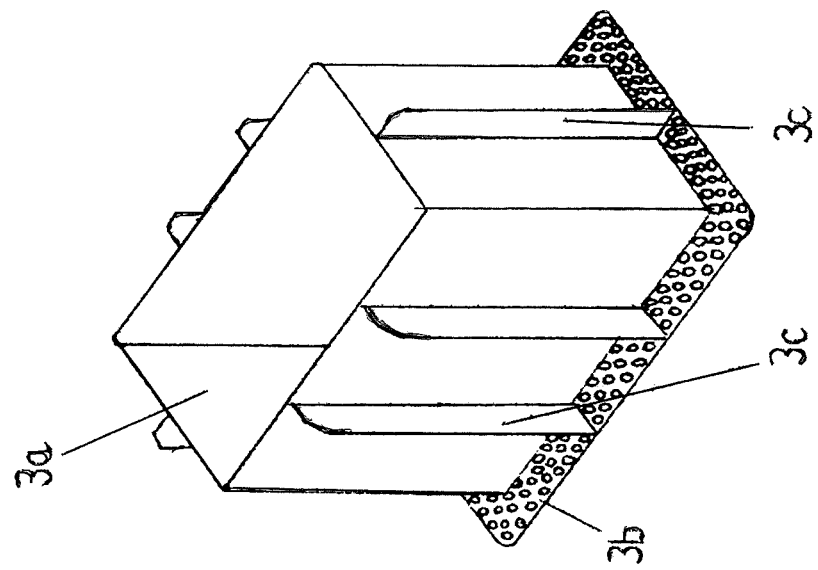

SMARTER COOLER

CROSS-REFERENCES TO RELATED APPLICATIONS

N/A

BACKGROUND OF THE INVENTION

Field of the Invention

This particular item is a normal type of ice chest, cooler, or plastic portable container that would normally be used to keep food or beverages at a cooler temperature than the surrounding outside ambient temperature with the use of ice cubes or frozen plastic modules. This unit holds the ice cubes in a separate portion of the cooler keeping the ice and frozen modules away from the food. It would also have a separate storage unit at the bottom of The Smarter Cooler, that would allow the melted ice to drain into that area and keep the food and other items dry.

Description of the Related Art

This particular item, a food and beverage cooler, is utilized by every person in every walk of life when they have a need or desire to transport, or keep food and beverages at an appropriately safe temperature for human consumption in any location.

The problem with the current technology for food and beverage coolers is that it has remained the same since its introduction into the American marketplace in the 1950's. Every manufacturer makes the inside of their cooler exactly the same with a large storage area inside the cooler, and that is it, and they ALL have the following problems:
1. A person has to place a large quantity of ice cubes in the "cooler" so that it can keep food or beverages cold, which also takes up much, ¼th to ⅓rd, of the storage space for food and beverages in the cooler.
2. Once the ice cubes have been in the cooler for a period of time they melt, and if any sandwiches, or other type of non-water friendly food slips to the bottom of the cooler, the food is ruined by sitting in water from the melted ice.
3. Recently, frozen plastic modules have been introduced to help alleviate problem #2, but, they still leave us with problem #1 and #4, i.e. they use up ¼th to ⅓rd of the limited space in the cooler that could be used for food or beverage storage in a cool environment, and they provide only one cooling source for the food and beverage, and consequently only the items that are closest to the ice cubes or plastic frozen modules will benefit the most from their cooling properties.
4. All coolers also have the problem that they only provide one cooling source for the food and beverages that are kept in the cooler and those are the items that are kept closest to the ice cubes or plastic frozen modules. The further the food and beverage items are away from the cooling sources, ice cubes or frozen modules, the less benefit they derive from the cooling mediums.

BRIEF SUMMARY OF THE INVENTION

This cooler would be assembled in the same manner as current coolers using plastic Blow Molding process, and having the handles, and an external residue ice water spout, and the Insert Isolator that keeps the ice and frozen plastic modules away from the food in the cooler would be made via Injection Molding process. This same cooler could be also made out of metal, or from cloth, and be designed using these materials as well, but it would have this separate storage compartment which is part of The Smarter Cooler, called the Insert Isolator, with an Ice Melting Storage Area, built into the design The Ice Melting Storage Area would be located in the bottom of the cooler, and the ice would be placed in the vertical walls between the inside of the cooler and the Insert Isolator. Once the ice melts it would pass through the perforated holes of the bottom piece of the Insert Isolator, and it would come to rest, via gravity, in the Ice Melting Storage Area which is located at the bottom of the The Smarter Cooler.

The advantages of this product and the characteristics which make it unique from all other coolers are quite clear when you look at the design of The Smarter Cooler:
1. No space is lost inside the cooler for the storing of food and beverages due to the large quantity of ice cubes, or the numerous frozen plastic modules. The cooler can have very slim side walls instead of the 1½" to 2" walls in normal coolers because the ice and the plastic modules provide a 2" insulating barrier to outside ambient temperatures, which is normally just empty space in any other cooler.
2. The normally unused insulating space of typical coolers, on four sides of the cooler, is now used for the storage of cooling mediums such as: ice or frozen plastic modules, and still provides a 2-3" insulating barrier from outside ambient temperatures."
3. Food on the bottom of the cooler is not ruined after a few hours because it is sitting in a pool of water from melted ice cubes. Water from melted ice cubes is stored in a storage area at the bottom of the cooler, which keeps the water away from food and still assists in the cooling function, by adding a fifth cooling side for the food and beverages, which is now located on the bottom of the cooler. An external drain faucet is provided on the bottom of the cooler to drain out the melted ice water at the appropriate or convenient time.

BRIEF DESCRIPTION OF VIEWS OF THE DRAWING

FIG. 1 depicts an elevated plan view of the Smarter Cooler.

FIG. 2 depicts a an elevated plan view of The Smarter Cooler.

FIG. 3 depicts an interior view of the Smarter Cooler.

DETAILED DESCRIPTION OF THE INVENTION

The elements that provide the improvement in the standard design of food and beverage coolers, and the elements that distinguish it from other older cooler designs are the following: All coolers for food and beverages, which have been manufactured since the 1950's, are basically rectangles that are made out of plastic, metal, or cloth of some type.

The internal area of ALL coolers is merely empty space with where you can place your food for storage purposes and keep it at a simulated home refrigerator type of temperature for variable period of time based on a variety of temperature conditions inside and outside the cooler, and depending on the insulation properties of the cooler, and how much ice or how many plastic frozen modules you place inside the cooler.

The typical user of this cooler will add to the cooler either Ice Cubes, Ice Blocks, Dry Ice, or Plastic Modules, that are taken from your home freezer, and then placed in a cooler to help keep food and beverages cold. The problem with all coolers is that once you place the ice and or plastic frozen modules inside with the food you will always have a number of problems with both of these mediums that are designed to keep food and beverages at a cold temperature. The first problem is that with either a standard bag of ice from a store, or a sufficient amount of ice from your refrigerator, you will find that with the ice or frozen plastic modules, you will take up about ¼th to ⅓rd of your food and beverage storage area by placing ice or the modules in your cooler.

This amount of ice also limits how many items you can place in the cooler. The second problem is that when the ice melts you will have all of your food and beverages floating in melted ice water. In addition, another problem is that those items that are closest to the cooling mediums, i.e. the ice or frozen plastic modules will be the coldest and the items further away from the cooling mediums will receive less of the cooling benefits of the ice or plastic modules.

The Smarter Cooler alleviates these problems in three different methods compared to all cooler designs. The first problem that The Smarter Cooler solves is that the walls of the cooler are much thinner than regular coolers that are usually 1½" to 2½" thick that provide insulation for the food and beverages contained in the cooler. The Smarter Cooler has the Insert Isolator, FIG. 3, which uses the normally vacant area, 1½" to 2½" in the sidewalls of all coolers, and replaces that with ice and frozen plastic modules that are 2" in thickness, in addition to the 1 inch thickness of the walls of The Smarter Cooler, which results in 3 inches of insulating and cooling area compared to 1½" to 2½" of blank air space that all coolers in the market currently utilize. See FIG. 2.

Of course the thickness of the outside insulating walls of The Smarter Cooler can be varied from ½" to 1" or thicker depending on the design. In total the "Smarter Cooler" only needs an additional ¼" to ½" of space on the inside of the cooler compared to other coolers to provide this additional cooling advantage, and it does not take up ¼th to ⅓rd of the cooling area, like all other coolers, now that the ice or plastic frozen modules have been put in the cooler. The walls of The Smarter Cooler would be made from the blow-molding process that is commonly used in the construction of plastic coolers, but the same principles using the Insert Isolator with its' advantages could be applied in the design of metal or cloth coolers as well.

The second advantage of the Insert Isolator, which would be made from plastic, in these drawings, but could also be made from metal or cloth, but in this patent it would be made from injected molded plastic, is that it keeps the melting ice and frozen plastic modules isolated from the food and beverages, so that no food or beverages are found to be floating in melted ice water.

The next advantage, is that the bottom piece of the Insert Isolator in the area that holds and keeps the ice and the plastic frozen modules isolated from the food and beverages, there is a perforated area, 3b, where the melted ice water can go through the perforation into the Ice Water Reservoir, 2c, in the bottom of The Smarter Cooler, and again be kept separate from the food and beverages.

The next advantage, is that when you put in ice or frozen plastic modules into a normal cooler you usually have cooling from only "one direction," and the items closest to the ice or frozen modules will be kept the coolest, but with the Smarter Cooler you will have cooling from four different directions because of the design of the Insert Isolator, and if ice is used, five different directions will provide cooling for the food and beverages as the ice melts and fills the Ice Water Reservoir of The Smarter Cooler.

The Insert Isolator and The Smarter Cooler would be made in a variety of sizes to match the size of the consumer demand for the size that it is being used, and the amount food and beverages that are to be stored in the cooler.

FIG. 1 is a plan view of the cooler having four sides of the ice storage areas 1a, which are provided by the insert isolator 1b, unit inside the cooler. The walls of the Insert Isolator 1b go from the top of the cooler wall to the bottom where they connect with the perforated area 1c, that allows the melting ice to flow into the Ice Water Holding Area 1d. Underneath each ice holding area 1d there is a perforated plastic area 1c, shown by a cutout view, which allows the melted ice to drain down into the Ice Water Holding Area 1d, where it not only holds the melted ice water, but also provides another layer of insulation on the bottom side of The Smarter Cooler and provides additional cooling to keep the food and beverages colder longer. The external faucet 1e, allows for the release of the melted ice water from the bottom area of The Smarter Cooler.

FIG. 2 illustrates how the insert isolator 2a provides at least four separate areas 2b of the insert isolator 2a. The areas 2b of cooling storage surrounds the food and beverages on all four sides of the cooler. Insert Isolator 2a shows that it will hold either ice or frozen plastic modules providing cooling for food and beverages stored in The Smarter Cooler insert isolator 1b.

Ice Water Reservoir 2c is where the water will be stored underneath the perforated area (1c of FIG. 1) that is a conduit for the melted ice to reach the ice water reservoir 2c and provides for the fifth cooling side that is on the bottom of The Smarter Cooler.

Once the ice is melting and becomes stored in the ice water reservoir 2c on the bottom of The Smarter Cooler, it will provide a fifth side that will provide cooling for the food and beverages that are stored in the cooler providing even more insulation and cooling surfaces than any other cooler in existence.

Faucet 2d and Shows how the Melted Ice Water can be Released from the Smarter Cooler.

FIG. 3 depicts a view of the Insert Isolator 3a which fits inside The Smarter Cooler to provide the structure which will keep the ice and frozen plastic modules separated from the food and beverages that would be stored in the cooler and would have the perforated bottom 3b on the outside of the structure that would allow for the melted ice to pass into the ice water reservoir in the bottom of The Smarter Cooler. An inside area 3a is where the food and beverages would be stored.

Perforation layer 3b is at the base of the Insert Isolator that would provide holes for the melted ice to drain into the ice water reservoir (2c of FIG. 2) at the bottom of The Smarter Cooler. There are several ridges 3c on the outside surface of the Insert Isolator that would provide stability, and a means to connect it to inner walls of The Smarter Cooler and provide a constant, and consistent gap, that would allow for the insertion of ice or frozen plastic modules on all four sides of the Insert Isolator 2a, and provide cooling from four different sides. These ridges would go from the top of the Insert Isolator to the bottom of the Insert Isolator, and would be in contact with the perforations that are on the bottom of the Insert Isolator to provide stability for the unit as food and beverages are taken in and out of The Smarter Cooler.

The invention claimed is:

1. A container for maintaining temperature of contents within the container, comprising:

a rectangular housing having four walls, a top cover and a bottom;

a content storage area having four walls formed within the four walls of the housing, wherein each wall of the content storage area is parallel to a corresponding wall of the four walls of the housing;

at least four ridges, wherein each ridge of the at least four ridges extends from an outer surface of at least one wall of the four walls of the content storage area to at least one wall of the four walls of the housing; and a coolant storage area created between the four walls of the housing and the four walls of the content storage area, and a perforated layer connected to and supporting the coolant storage area;

wherein each ridge of the at least four ridges runs from an uppermost top edge of at least one wall of the four walls of the content storage area to the perforated layer so as to maintain a set dimension between the four walls of the content storage area and the four walls of the housing, and, with contents placed in the content storage area and a coolant selected from a list of any one of ice, dry ice, and ice packs, the coolant is placed in the coolant storage area and the contents are maintained at a temperature regulated by the coolant, wherein the top cover covers the four walls of the housing, the content storage area, and the coolant storage area.

2. The container of claim 1, wherein the perforated layer is enabled to receive water from the coolant storage area and the water is transferred to a reservoir under the perforated layer.

3. The container of claim 1 wherein the coolant storage area has a dimension between the four walls of the housing and four walls of the content storage area of between 1.5 and 2.5 inches.

4. The container of claim 2, wherein when water from the coolant is transferred to the reservoir, the content storage area is cooled from the four walls and the bottom, thereby creating five cooling sides to the content storage area.

5. The container of claim 4, wherein the sides also insulate the contents thereby contributing to maintaining the temperature of the contents.

6. The container of claim 1, wherein the contents are any one or more of food and beverages.

* * * * *